Feb. 3, 1931. P. KAMPER 1,791,414
ROTARY VALVE
Filed March 30, 1928
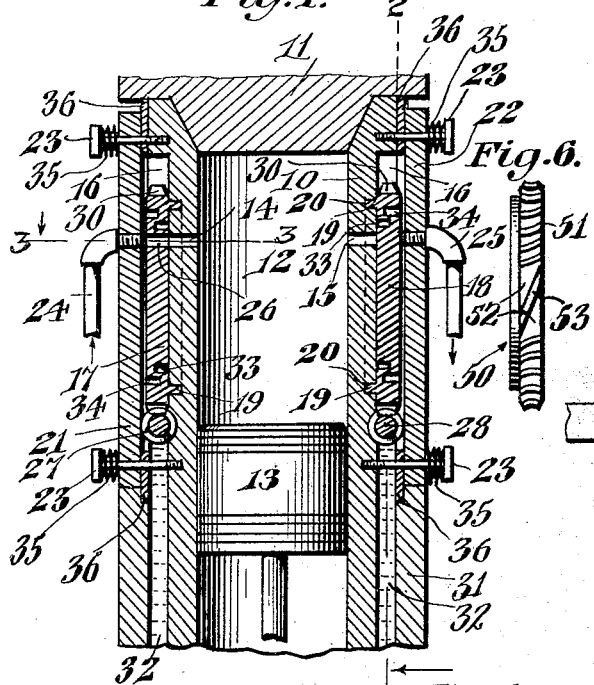
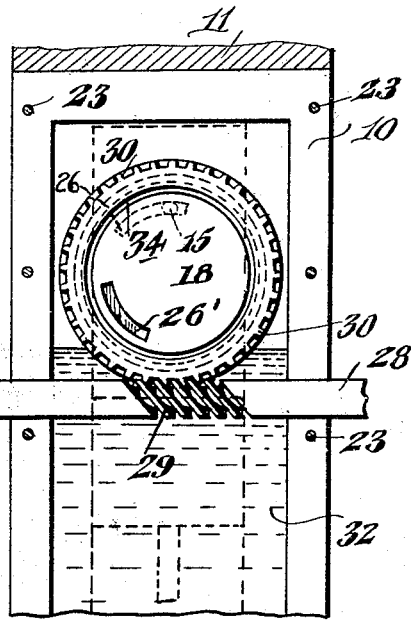
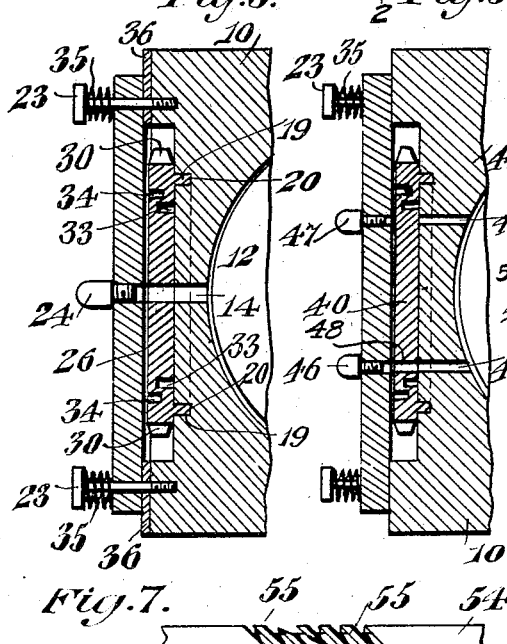
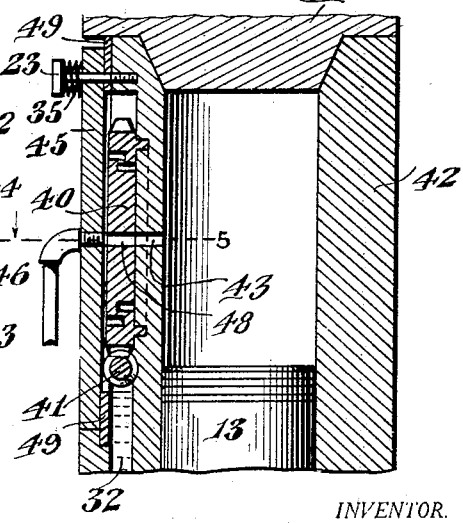
INVENTOR.
Peter Kamper,
BY Geo. P. Kimmel
ATTORNEY.

Patented Feb. 3, 1931

1,791,414

UNITED STATES PATENT OFFICE

PETER KAMPER, OF FLINT, MICHIGAN

ROTARY VALVE

Application filed March 30, 1928. Serial No. 265,976.

This invention relates to improvements in rotary valves for controlling the inlet and outlet ports to the cylinders of engines wherein reciprocating pistons are employed, more particularly to internal combustion engines, but it is to be understood that my valve may be employed in connection with steam engines and the like.

The primary object of the invention is to provide in a manner as hereinafter set forth, a valve of the above mentioned class which may be operated by a minimum number of movable parts, thereby reducing to a minimum, the necessity of adjustments and repairs.

A further object is to provide a valve as aforesaid which may be oil cooled and which is provided with expansion grooves to insure the constancy of its shape and size.

A further object of the invention is to provide a valve as aforesaid which is strong and durable, simple in construction and operation and which may be economically manufactured.

Other objects and advantages will be apparent during the course of the following description.

In the accompanying drawings, in which like numerals are employed to designate like parts throughout the same, Figure 1 is a longitudinal section of a cylinder embodying a form of my invention, Figure 2 is a section taken on line 2—2 of Figure 1, Figure 3 is a section taken on line 3—3 of Figure 1, Figure 4 is a view similar to Figure 1, showing a modified form of my invention, Figure 5 is a section taken on line 5—5 of Figure 4, Figure 6 is a detail view of a modified form of valve, and, Figure 7 is a fragmentary, detail view of the drive shaft therefor.

Referring now to the drawings, with reference to Figures 1, 2, and 3, the numerals 10 and 11 respectively designate the wall and head of a four cycle, internal combustion engine cylinder formed with a cylindrical chamber 12 within which reciprocates a piston 13. The wall 10 is provided with inlet and outlet ports 14 and 15 respectively, preferably disposed at diametrically opposite points thereof.

Formed on opposite sides of the wall 10, exteriorly thereof, are relatively large recesses or depressions 16 within which are disposed the valves 17 and 18, which are circular in form and are provided with inwardly extending annular flanges 19 adjacent the peripheries thereof, for seating in corresponding grooves 20 formed in the recessed portions of the wall 10. The valves 17 and 18 are held in place by means of plates 21 and 22 respectively, which overlie the valves and are secured to the wall 10 by means of bolts 23. Threaded into said plates respectively is an intake pipe 24 and an exhaust pipe 25, said pipes respectively having their openings in alinement with the inlet and outlet ports 14 and 15. The valves 17 and 18 are provided with ports 26 and 26' respectively, which extend transversely through the valves for selectively establishing comunication between the intake pipe 24 and inlet port 14, and the exhaust pipe 25 and outlet port 15. Reference to Figure 1 will show the inlet port 14 open and the outlet port 15 closed. In this figure, the piston 13 is shown near the end of its suction stroke.

The valves 17 and 18 respectively are rotated by means of the driving shafts 27 and 28, each of which is provided with a worm 29 to mesh with the beveled teeth 30 disposed peripherally on said valves. The shafts 27 and 28 are driven by the crank shaft of the engine in any suitable manner.

The lower portion of the wall 10 is thickened as at 31, and the plates 21 and 22 rest with their lower edges seated on the upper wall of this thickened portion, the outer sides of said plates and thickened portion being in alinement. In the thickened portion 31, on opposite sides of the cylinder, are oil wells 32, which are formed in continuation of the recesses 16, the plates 21 and 22 forming the outer walls of the upper portions of the wells. The level of the oil in said wells is kept above the drive shafts 27 and 28, as clearly shown in Figure 2, in order that the worm 29 and teeth 30 in mesh therewith, may continuously run in oil, thereby reducing friction and tending to cool the valves 17 and 18.

Provision is made in the valves 17 and 18 for the elimination of diametrical expansion by means of the annular grooves 33 and 34, formed in the inner and outer side faces respectively of said valves. The grooves 33 are of less diameter than the grooves 34 and disposed concentrically thereto. The combined depth of the grooves 33 and 34 is slightly greater than the thickness of the valves 17 and 18 so that the bottom portions thereof overlap each other, thereby providing annular spaces for the entire thickness of the valves to take up diametrical expansion thereof. Automatic adjustment is provided for any transverse expansion of the valves by the manner in which the plates 21 and 22 are anchored in place. The bolts 23 extend slidably through the plates and are threaded into the wall 10 and between the head of each bolt and the outer face of the plate, a relatively strong helical spring 35 encircles the bolt to normally force the plates inwardly. The valves 17 and 18 are normally of slightly less thickness than the spaces between the plates 21 and 22 and the wall 10 and if the valves expand transversely sufficiently to bear against said plates, the springs 35 are compressed to permit outward movement to the plates, away from the valves. A gasket 36 is disposed between the wall 10 and each of the plates 21 and 22 adjacent the edges of the plates, through which the bolts 23 extend. The gasket may be removed and the plates replaced without the gasket, in case the valves become worn to such an extent that they have too much clearance.

In the operation of this form of my invention embodying two valves for each cylinder, the valves, as viewed in Figure 2, rotate in a counter clockwise direction and the ports 26 and 26' are relatively arranged so that the exhaust port 15 is closed just before the intake port 14 is opened. The teeth 30 of the valves are in mesh with the worms 29 of the drive shafts 27 and 28, and upon rotation of the latter, the valves are directly rotated thereby. The valves are properly timed to open and close in the same manner as any other type of valve. Obviously in a four cycle engine, the ratio of the valves 17 and 18 to the crank shaft, not shown, is 1 to 2, and so long as this ratio obtains, the sub ratios between the valves 17 and 18 and the drive shafts 27 and 28, respectively, and between the latter and the crank shaft, is immaterial.

Referring now to Figures 4 and 5 of the drawings, the structure is the same as that above described in most respects and only one valve 40 is provided which is driven by the drive shaft 41. The cylinder wall 42 is provided with an inlet port 43 and an outlet port 44, both on the side of the cylinder upon which the valve 40 is disposed. The plate 45 has threaded therethrough an intake pipe 46 and an exhaust pipe 47, the openings in said pipes respectively being in alinement with the ports 43 and 44. A port or opening 48 is provided through the valve 40 for alternately establishing communication between the intake pipe 46 and inlet port 43 and the exhaust pipe 47 and the outlet port 44. A shim 49 is disposed between the wall 42 and plate 45 adjacent the upper and lower edges of the latter, which may be removed after excessive wear on the valve. The plate 45, adjacent the side edges thereof, rests directly against the wall 42, as clearly shown in Figure 5.

The operation of this form of the invention is the same as that above described in connection with Figures 1, 2 and 3, except that in this form there is only one valve for each cylinder and only one drive shaft therefor. As viewed from the left in Figures 4 and 5 the valve is driven directly by the drive shaft in a clockwise direction and is timed to properly open and close the inlet and outlet ports of the cylinder in accordance with the strokes of the piston. The ports 43 and 44 are disposed substantially 90° apart with the intake port 43 following the exhaust port 44 in the direction of rotation of the valve 40 so that the exhaust port 44 is closed just before the intake port 43 is opened. In Figure 4 the piston 13 is shown near the end of its suction stroke and the ratio of the valve 40 to the crank shaft, not shown, is the same as that above described in connection with the embodiment shown in Figures 1, 2 and 3.

In Figures 6 and 7, I show a modified form of valve and drive shaft therefor which may be used in connection with either type of cylinder above described, two valves and two shafts being required for the form shown in Figures 1, 2 and 3, and only one valve and one shaft being required for the form shown in Figures 4 and 5.

This modified form of valve 50 is the same in all respects as the valve above described except that a plurality of uniform bevel teeth 51 are disposed about the periphery thereof, continuously except for a space 52 at one portion of the periphery. Within the space 52 is disposed a single tooth 53, which is relatively larger than the teeth 51 and is disposed at a greater angle to the transverse plane of the valve.

The drive shaft 54 is provided with a worm 55 to mesh with the teeth 51 of the valve, and is also provided with a diagonal groove 56, which is disposed at a greater angle to the transverse plane of the shaft 54 than the angle of the worm 55 to such plane of the shaft and traverses a central portion of the worm 55, as clearly shown in Figure 7. The groove 56 is of sufficient size to receive therein the tooth 53, which is too large to mesh with the worm 55.

In the operation of this modified form of valve, the valve 50 is rotated by the meshing of the worm 55 with the teeth 51 in the same manner as above described in connection with the valves 17 and 18, but the valve is timed so that just before it is to register its port with the port in the cylinder, the tooth 53 is received in the groove 56 and carried forwardly therein, thereby speeding up the valve. While the tooth 53 and groove 56 are in engagement, the teeth 51 and worm 55 are held out of mesh due to the space 52, and the tooth 53 cannot mesh with the worm 55, due to the size of said tooth. In a four cycle engine, a 1 to 2 ratio is employed between the valve 50 and crank shaft, the same as for the valves 17, 18 and 40 heretofore described.

It is to be understood that the forms of my invention herewith shown and described are to be taken as preferred examples of the same and that various changes in the size, shape and arrangement of parts may be resorted to without departing from the spirit of my invention or the scope of the appended claims.

What I claim is:

1. In combination, a cylinder having its wall formed with a port extending through the wall, a circular, rotary valve for opening and closing said port, and means for rotating the valve, said valve being formed in each of its inner and outer side faces with a circumferentially extending groove, said grooves having their innermost portions disposed in overlapping relation diametrically of the valve.

2. In combination, a cylinder having its wall formed in its outer face with a recess and further formed with a port extending through the wall and opening into the recess, a circular, rotary valve within the recess for opening and closing said port, and a worm shaft to drive the valve by direct contact with the periphery thereof, said valve being formed in each of its inner and outer side faces with a circumferentially extending groove, said grooves having their innermost portions disposed in overlapping relation diametrically of the valve.

3. In combination, a cylinder having its wall formed in its outer face with a recess and further formed with a port extending through the wall and opening into the recess, a circular, rotary valve within the recess for opening and closing said port, a worm shaft to drive the valve by direct contact with the periphery thereof, said valve being formed in each of its inner and outer side faces with a circumferentially extending groove, said grooves having their innermost portions disposed in overlapping relation diametrically of the valve, and a plate resiliently secured to the cylinder wall for enclosing said recess.

4. As an article of manufacture, a substantially disk-shaped rotary valve having its side faces formed with circumferentially extending grooves, said grooves having their innermost portions disposed in overlapping relation diametrically of the valve.

In testimony whereof, I affix my signature hereto.

PETER KAMPER.